(12) United States Patent
Schwert et al.

(10) Patent No.: US 6,779,563 B2
(45) Date of Patent: Aug. 24, 2004

(54) METHOD AND TUBE FOR LINING A HIGH PRESSURE PIPE

(75) Inventors: Siegfried Schwert, Huttenweg 16, Berlin (DE), 14195; Georg Mair, Berlin (DE); Andreas Huttemann, Berlin (DE); Peter Marquardt, Berlin (DE)

(73) Assignee: Siegfried Schwert, Berlin (DE)

( * ) Notice: Subject to any disclaimer, the term of this patent is extended or adjusted under 35 U.S.C. 154(b) by 0 days.

(21) Appl. No.: 10/110,745

(22) PCT Filed: Aug. 17, 2001

(86) PCT No.: PCT/EP01/09539

§ 371 (c)(1),
(2), (4) Date: Aug. 6, 2002

(87) PCT Pub. No.: WO02/14592

PCT Pub. Date: Feb. 21, 2002

(65) Prior Publication Data

US 2003/0029018 A1 Feb. 13, 2003

(30) Foreign Application Priority Data

Aug. 17, 2000 (DE) ........................................ 100 42 166

(51) Int. Cl.⁷ ............................................... F16L 55/16
(52) U.S. Cl. ........................... 138/98; 138/97; 264/269; 156/287; 405/150.1
(58) Field of Search ............................ 138/98, 97, 123, 138/125; 264/269, 516, 36.1; 156/287, 94; 405/150.1, 184.2

(56) References Cited

U.S. PATENT DOCUMENTS

| | | | | |
|---|---|---|---|---|
| 2,312,993 A | * | 3/1943 | Stephens | 156/87 |
| 4,576,205 A | * | 3/1986 | Morinaga et al. | 138/98 |
| 4,600,615 A | * | 7/1986 | Hyodo et al. | 138/125 |
| 4,681,783 A | * | 7/1987 | Hyodo et al. | 428/36.1 |
| 4,686,126 A | * | 8/1987 | Hyodo et al. | 428/36.1 |
| 4,723,579 A | * | 2/1988 | Hyodo et al. | 138/124 |
| 4,724,178 A | * | 2/1988 | Hyodo et al. | 428/36.1 |
| 4,972,880 A | * | 11/1990 | Strand | 138/98 |
| 5,164,237 A | | 11/1992 | Kaneda et al. | 138/125 |
| 5,337,823 A | * | 8/1994 | Nobileau | 166/277 |
| 5,501,248 A | * | 3/1996 | Kiest, Jr. | 138/98 |
| 5,695,008 A | * | 12/1997 | Bertet et al. | 166/187 |
| 6,634,828 B1 | * | 10/2003 | Hovad | 405/55 |

FOREIGN PATENT DOCUMENTS

| | | |
|---|---|---|
| CH | 675704 A5 | 10/1990 |
| WO | WO 92/06235 | 4/1992 |
| WO | WO 94/25655 | 11/1994 |
| WO | WO 98/24616 | 6/1998 |

OTHER PUBLICATIONS

Saltel, J.L. et al., "In–Situ Polymerisation of an Inflatable Composite Sleeve to Reline Damaged Tubing and Shut–off Perforation," pp. 487–495, Annual Offshore Technology Conference, Houston, Texas, May 6, 1996.

* cited by examiner

Primary Examiner—Patrick Brinson
(74) Attorney, Agent, or Firm—Brinks Hofer Gilson & Lione

(57) ABSTRACT

The invention relates to a method for lining a high pressure pipe with a tube made from interlocking, high-tensile high performance fibers, with a plastic coating applied thereto, whereby the high performance fibers are arranged in an interwoven structure and introduced into the pipe in a state of mobility relative to each other. The introduced meshing is then pressed against the inner wall of the pipe by altering the geometrical arrangement of the high performance fibers with relation to each other and then fixed by the mutual arrangement of the high performance fibers adopted after the laying thereof. The invention further relates to a tube for lining a high-pressure pipe comprising interlocking, high-tensile high performance fibers and a plastic coating applied thereto, embodied such that the high performance fibers are arranged within the structure as a mesh and the angle of the high performance fibers may be altered in relation to the perpendicular to the tube axis before the lining, such that an enlarging of the tube in a radial direction is possible.

11 Claims, 2 Drawing Sheets

METHOD AND TUBE FOR LINING A HIGH PRESSURE PIPE

BACKGROUND OF THE INVENTION

This invention relates to a method of lining a high-pressure pipe with a tube formed from interlocking, high-tensile high-performance fibers and a plastic coating applied to the fibers, and the construction of such a tube.

The invention relates to a method according to the preamble of claim 1 as well as a tube according to the preamble of claim 6.

High-pressure pipes transport fluid media at a pressure in the range of more than 1 bar. The pipes must therefore withstand correspondingly high forces and be of adequate dimensions. For the tubes, therefore, so-called high-performance fibres are used which have a high tearing strength and are relatively high-tensile. From the viewpoint of increasing the strength, these fibres are most effective when they run perpendicular to the longitudinal axis of the pipe or tube. The fabrics of the known tubes are so configured that they consist of warp and weft threads which run in the longitudinal direction of the tube or respectively perpendicular to same. These tubes, however, have only low tensibility in a radial direction. This tensibility is not sufficient, however, to compensate for production tolerances of the pipes and the tubes. Since maximum tolerances of the pipes and the tubes of roughly 3% in each case have to be taken into account, a tube of this type should have a tensibility of not less than 6%.

The previous renovation tubes for high-pressure pipes have, as mentioned above, a fabric formed from warp and weft threads, the warp threads running in the longitudinal direction of the pipe.

The object of the present invention, therefore, is to give a method for lining a high-pressure pipe with a tube formed from interlocking, high-tensile high-performance fibres and a plastics coating applied to said fibres, as well as a tube of this type, which despite high strength in a radial direction and also in an axial direction permit a maximum radial enlargement of the tube to at least 3% above the nominal diameter of the pipe.

SUMMARY OF THE INVENTION

This object is accomplished according to the present invention by arranging the high-performance fibers in a braided or meshing structure that is introduced into the pipe with the fibers in a state of mobility relative to one another so that the introduced meshing is positioned against the inner wall of the pipe by altering the geometrical arrangement of the high-performance fibers in relation to one another. The mutual arrangement of the high-performance fibers is then fixed in the position that they have assumed as a result of the positioning of the fibers against the pipe inner wall. The tube structure that will permit this operation is a braided structure wherein the high-performance fibers are angled in relation to the perpendicular to the tube axis before lining so that during the lining operation the tube can be enlarged in a radial direction.

Since the high-performance fibres are arranged in a braided structure and are introduced into the pipe in a state of mobility relative to one another, and since the introduced meshing is laid against the inner wall of the pipe by altering the geometrical arrangement of the high-performance fibres in relation to one another and these fibres are then fixed in their relative position assumed after they have been laid, the tube can, as it is laid against the inner wall of the pipe, be so enlarged in a radial direction practically without any force, that production tolerances or otherwise caused fluctuations of the inside diameter of the pipe can be compensated without the high-performance fibres themselves being stretched.

BRIEF DESCRIPTION OF THE DRAWINGS

The invention is explained in greater detail below with the aid of an embodiment represented in the figures. These show.

DESCRIPTION OF PREFERRED EMBODIMENT

Figure 1:
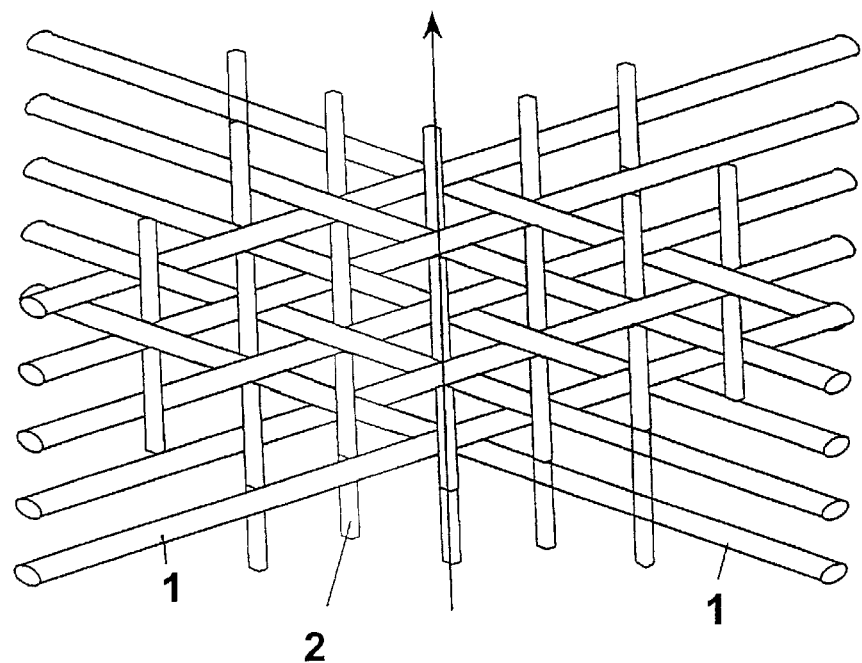
FIG. 1 a detail of a non-coated fabric in the form of a meshing formed from fibres crossed alternately over and under one another before being introduced into the pipe, and FIG. 2 the arrangement of the fibres of the meshing according to FIG. 1 after being laid against the inner wall of the pipe and being fixed by the plastics coating.

FIG. 1 shows the meshing before it is introduced into the pipe and fixed to the inner wall of same. The mutual crossing angles of the high-performance fibres 1 and their angle in relation to the perpendicular to the tube axis are insignificant as long as the high-performance fibres 1 are so mobile relative to one another that they can be brought without any tension into the orientation shown in FIG. 2. This orientation arises after the meshing has been introduced into the pipe and laid against its inner wall.

The meshing can be introduced into the pipe for example by inversion or by simple pulling-in. In particular in the case of inversion it is necessary for the meshing to be already provided with a coating which is impermeable by the medium used for the inversion, usually air. This coating must be so elastic that it still permits adequate movement of the high-performance fibres 1 relative to one another, in order to be able to lay the meshing practically tension-free against the inner wall of a pipe which has an inside diameter lying within the tolerance range. After being laid against the inner wall, the meshing is fixed. If initially only the meshing without any coating has been introduced into the pipe, it is then fixed by the application of a subsequently hardening plastics material. If, on the other hand, the meshing has been introduced already in the coated state, the fixing can be carried out in such a way that the already present coating is subsequently hardened, or an additional, subsequently hardening, coating is applied.

In the tube, introduced into the pipe and laid against its inner wall, the high-tensile fibres should be at as small an angle as possible in relation to the perpendicular to the tube axis or the longitudinal axis of the pipe, which is indicated by an arrow, and this angle, depending on the admissible production tolerances of the pipe, makes possible a maximum enlargement of preferably in the range between 3% and 10% above the nominal diameter of the pipe, until the smallest possible angle in relation to the perpendicular of the tube is reached (roughly 10° to 35° depending on the type of braiding). This angle should be as small as possible for the reason that when there is internal pressure in the pipe, radial forces arise which are best absorbed by fibres running perpendicularly with respect to the tube axis, i.e. in a circumferential direction.

For coating the meshing before introducing it into the pipe it is advantageous if the meshing formed from fibres 1 is interspersed by so-called rib threads 2 (longitudinal threads which run parallel to the tube axis). During the coating process, these rib threads 2 are held at a specific length and are intended to absorb in an axial direction the forces acting on the meshing. They thus prevent the angle of the threads 1 in relation to the perpendicular to the tube axis from exceeding a specific value. Then only a further slight relative movement between the high-performance fibres 1 is necessary to lay the coated meshing against the inner wall of the pipe. The rib threads 2 can also have different mechanical properties from the fibres 1.

As suitable high-performance fibres to be used as fibres 1 in the meshing can be recommended e.g. glass fibres, aramid fibres, UHM (ultra-high molecular) PE fibres, carbon fibres, PBO (poly(p-phenylene-2,6-benzobisoxazole)) fibres or steel fibres.

The meshing can consist of yarns which are formed from the high-performance fibres. Individual yarns, or a plurality of yarns which run parallel or are twisted (braids) can be used here. Furthermore, rovings can be used. It is also possible to braid bands or belts woven or plaited from yarns.

Figure 2:
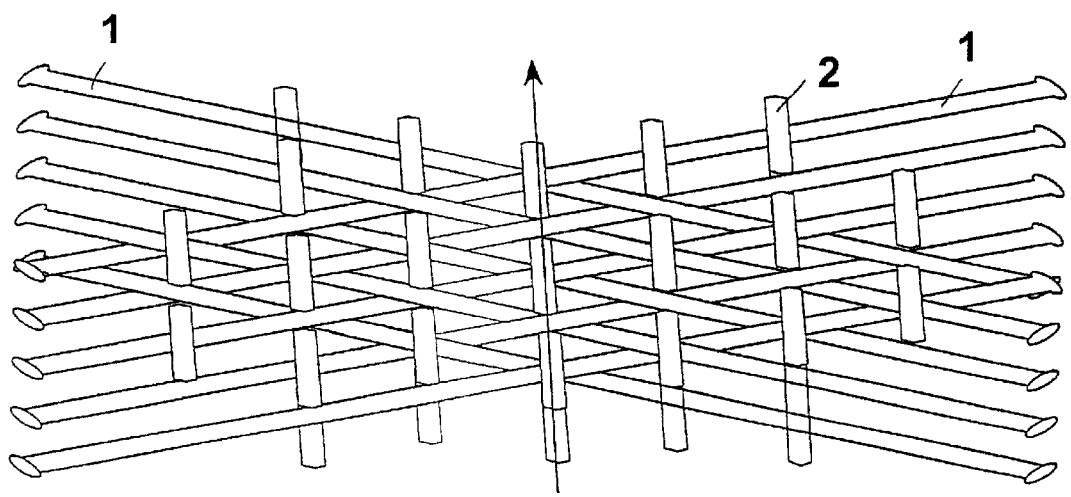
Figure 3:
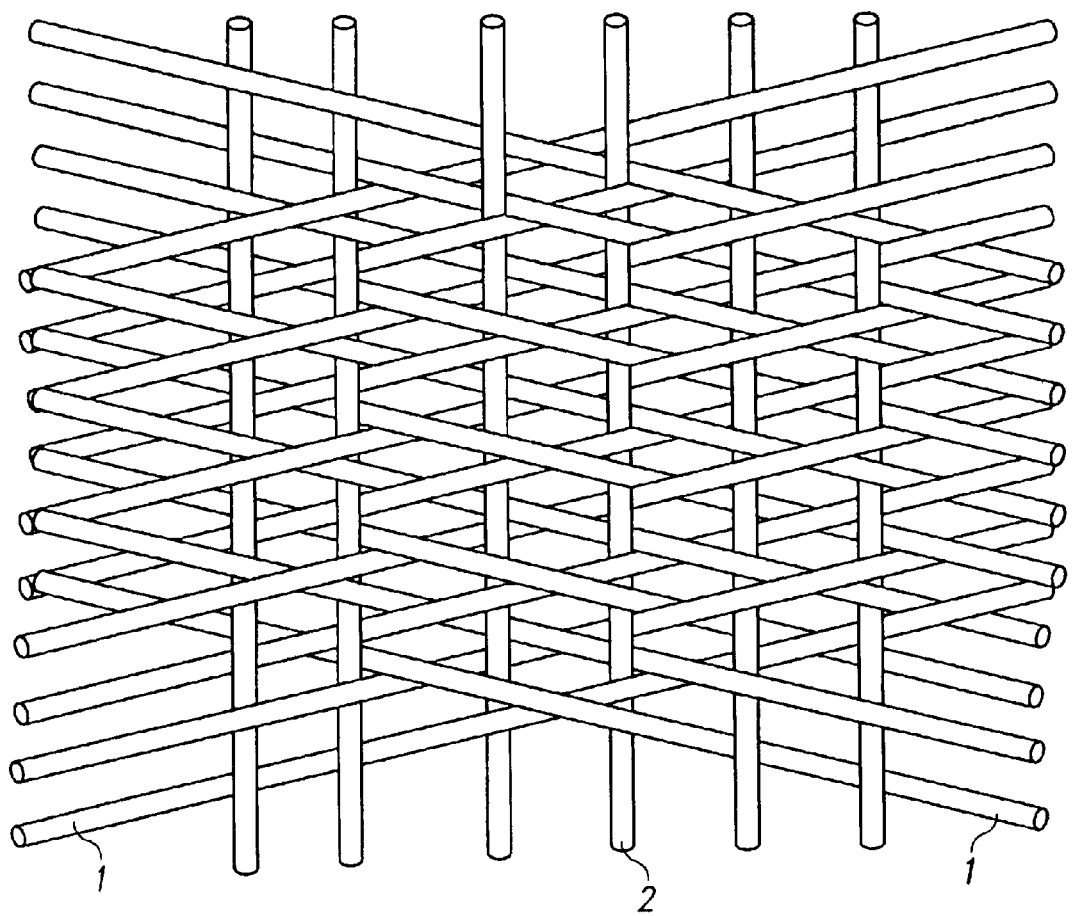
FIG. 3 a detail of a non-coated fabric in the form of a meshing formed from fibres crossed over two successive fibres and on the other side over the two next successive fibres.

The meshing can have braiding pattern 1, as shown in FIGS. 1 and 2, or braiding pattern 2, as shown in FIG. 3. In the case of braiding pattern 1, a fibre (or respectively yarn, roving, yarn bundle, band or belt) can be guided respectively on the one side only over one of the fibres crossing it and on the other side only over the subsequent fibre crossing it. In the case of braiding pattern 2, the fibre is guided on the one side respectively over two successive fibres and on the other side over the two next successive fibres.

What is claimed is:

1. Tube for lining a high-pressure pipe said tube comprising, interlocking, high-tensile high-performance fibres and a plastics coating applied to same, wherein the high-performance fibres are arranged in a braided structure and are introduced into said high-pressure pipe in a state of mobility relative to each other such that an angle of the high-performance fibres in relation to the perpendicular to the tube axis during lining is altered, providing enlargement of the tube in a radial direction, and wherein additional fibres in the axial direction of the tube are provided said additional fibres preventing the angle of the high-performance braided fibres in relation to the perpendicular to the tube from exceeding a specific value.

2. Tube according to claim 1, wherein the high-performance fibres intersect at an acute angle, enclosing the perpendicular to the tube axis.

3. Tube according to claims 1 or 2, wherein the angle of the high-performance fibres in relation to the perpendicular to the tube axis in the lining state is as small as possible.

4. Tube according to claims 1 or 2, wherein the high-performance fibres are free of internal stress in the lining state.

5. Tube according to claims 1 or 2, wherein the angles of the, braided high-performance fibres are symmetrical in relation to the perpendicular to the tube axis.

6. Tube according to claims 1 or 2, wherein the braided structure permits an enlargement of the tube in a radial direction in the range between roughly 3% and 10% above the nominal diameter of the pipe.

7. Tube according to claims 1 or 2, wherein the high-performance fibres are glass fibres, aramid fibres, UHMPE fibres, carbon fibres, PBO fibres or steel fibres.

8. Tube according to claims 1 or 2, wherein the braided structure is formed from individual yarns, a plurality of parallel or twisted yarns or rovings.

9. Tube according to claims 1 or 2, wherein the braided structure is formed from bands or belts woven or braided from yarns.

10. Tube according to claims 1 or 2, wherein in said braided structure, a high-performance fibre is guided respectively on the one side only over one of the angled high-performance fibres and on the other side only over another of the angled high-performance fibres.

11. Tube according to claims 1 or 2, wherein in said braided structure, a high-performance fibre is guided respectively on the one side over two successive angled high-performance fibres and on the other side over the next two successive angled high-performance fibres.

* * * * *